KARL KAUFMANN
AUGUSTIN SIEVERS
INVENTORS

United States Patent Office 3,273,455
Patented Sept. 20, 1966

3,273,455
PROJECTION SCREEN
Karl Kaufmann and Augustin Sievers, Bad Lippspringe, Germany, assignors to Mechanische Weberei G.m.b.H., Bad Lippspringe, Germany, a corporation of Germany
Filed May 15, 1964, Ser. No. 367,635
Claims priority, application Germany, May 18, 1963, M 56,883
4 Claims. (Cl. 88—28.9)

This invention relates to a projection screen and, more particularly, to apparatus arranged to receive the image from a slide or movie projector.

In the manufacture of projection screens, it is evident that better screens having higher reflection characteristics will be used more and more as time progresses. Such screens are those having crystal pearl surfaces, silver surfaces, stamped silver surfaces, or the so-called "mother-of-pearl" surfaces. Such special screens, however, always had one disadvantage and that is that they could not be folded and, therefore, could only be rolled between uses and during transportation or shipping; this means that the size of the screen could only be reduced in one dimension and the width remained the same. They have not been used, therefore, especially where large screens were necessary and where transportation has been very difficult, for example, on lecture tours or for traveling movies. The only foldable screens which could be packed in a small space, after being taken down, were made of white linen, which material reflects light equally in all directions and, therefore, requires a much greater light intensity from the projector. These and other difficulties experienced with the prior art devices have been obviated in a novel manner by the present invention.

It is, therefore, an outstanding object of the invention to provide a projection screen having a high reflection characteristic and which is, nevertheless, foldable.

Another object of this invention is the provision of a projection screen which is extremely durable and in which the components which give it its reflection characteristics are not easily damaged by wear and so forth.

A further object of the present invention is the provision of a projection screen in which a crease does not remain after folding.

With these and other objects in view, as will be apparent to those skilled in the art, the invention resides in the combination of elements set forth in the specification and covered by the claims appended hereto.

Figure 1:
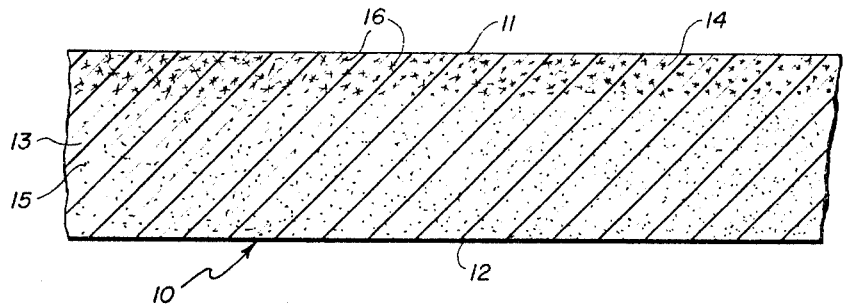
Figure 2:
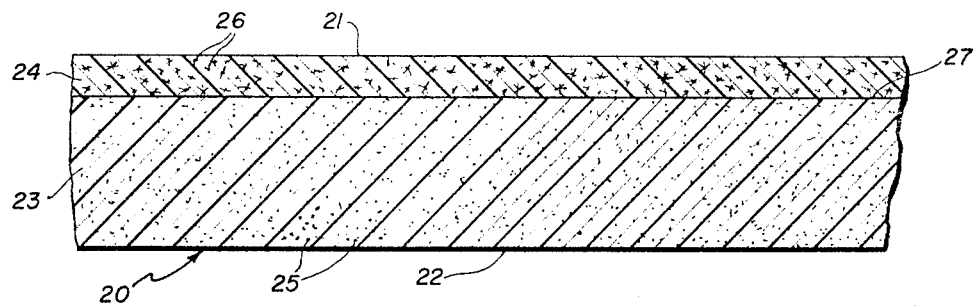

The character of the invention, however, may be best understood by certain of its structural forms as illustrated by the accompanying drawings in which:

FIG. 1 is a sectional view of a projection screen embodying the principles of the present invention, and FIG. 2 is a sectional view of a modified form of the screen.

In general, the present invention involves eliminating the disadvantages of the previously-known projection screens by making these screens from a plastic sheet material. This material must be chosen in a certain thickness to provide the necessary mechanical strength; it contains a softening agent with white pigment and with elements for producing a high reflection characteristic. The elements influencing the reflection characteristic can be embedded in the plastic film itself, or they can be applied to the surface of the plastic film and blended into it for durability. The material influencing the reflection characteristic can also be embedded in a thin sheet of plastic which, in turn, is bonded to the main body of plastic film to make them inseparable. In this case, the material of the cover sheet should be transparent, although it has also proven advantageous, on occasion, to insert white pigments. Titanium dioxide has been used successfully as the white pigment. So far as the material influencing the reflection characteristics is concerned, the following may be used: glass pearls, plastic pearls with a high index of refraction, silver or aluminum grains, lamilars of lead carbonate, and crystals of lamilar form, these all acting to reflect the light in the desired manner.

Referring first to FIG. 1, it can be seen that the projection screen, indicated by the reference numeral 10, is formed as a sheet of a suitable plastic material and has a front surface 11 and a rear surface 12. Embedded in the body of plastic are certain elements which influence its light characteristics. A thick layer 13 extending from the rear surface 12 to within a short distance of the front surface 11 is filled with a white pigment which, in the preferred embodiment, consists of particles 15 or a powder of titanium dioxide. A similar layer 14 located adjacent the front wall 11 is formed by introducing into the body of the plastic crystals 16 of lead carbonate giving a surface similar to the well-known "mother-of-pearl" appearance. The particles 15 of titanium oxide and the crystals 16 of lead carbonate may be introduced into the sheet of plastic in any of the well-known ways; for instance, by rolling, by adding softening agents, by use of a solvent, or by applying heat. Basically speaking, however, the portion of the plastic in the layer 14 will be relatively free of coloring agents, the crystals 16 being the only elements observable from the front surface of the sheet, whereas the layer 13 is relatively opaque, being filled with the particles of titanium dioxide, but being relatively free of crystals of lead carbonate.

Another example of the present invention is shown in FIG. 2. The projection screen, indicated generally by the reference numeral 20, is shown as having a front surface 21 and a rear surface 22. The screen consists of a rear sheet 23 of plastic and a front sheet 24. The rear sheet 23 has embedded in it particles 25 of titanium dioxide, while the front sheet 21 contains particles 26 of lead carbonate. The front sheet 24 is formed of a clear plastic and is relatively free of color except for the presence of the crystal 26, while the rear sheet 23 is rendered substantially white and opaque by the presence of considerable amount of the white particles 25. The two sheets are bonded along the common surface 27 to form an integral projection screen. In general, the material chosen for the base material for the screen is an optically-active material which will permit the bending of the sheet over the smallest desired radius permitting folding of the sheet without a permanent deformation. Any of the well known plastics may be used if care is exercised in the selection of the mechanical properties. The materials which influence the high reflective characteristics of the finished screen can be glass pearls, plastic pearls, crystal salts, such as the lead carbonate described above, and in some cases a metallic bronze or other metal grains which can be embedded in the plastic. When this is done in accordance with the invention, of course, it is unnecessary to use large amounts of this reflective material, since the material is protected from falling off and, therefore, only the exact desired amount is necessary; no extra amounts need to be added to take care of wear. In other words, since the plastic material itself contains and surrounds the active substance, this substance cannot detach itself from the screen, even during hard usage and severe mechanical strains. While the materials which are embedded in the surface of the screen adjacent the front surface increase the reflection characteristics, the pigment that is embedded in the major portion of the screen and certainly the portion adjacent the rear surface, creates a distribution of the reflecting light to produce a higher reflection over a larger solid angle in space.

Screens which have been fabricated in accordance with this invention after they have been taken down from the frame or screen can be folded in nearly any shape and can be packed in a very small container. Because of the improved reflection characteristics for a given weight of material, it is possible to use a much larger screen with a given intensity of projection.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A projection screen, comprising
    (a) a plastic sheet having front and rear surfaces,
    (b) coloring particles embedded in the sheet to form a first layer adjacent the rear surface, the plastic sheet being clear in the second layer with the exception of the crystals and the particles embedded in the first layer being present in sufficient quantity to render the first layer opaque, and
    (c) reflective crystals, the said crystals consisting of large particles of material with a pre-determined index of refraction embedded in the sheet to form a second layer adjacent the front surface.

2. A projection screen as recited in claim 1, wherein the said crystals are crystals of lead carbonate.

3. A projection screen as recited in claim 1, wherein the said particles are particles of titanium dioxide.

4. A projection screen as recited in claim 1, wherein the plastic sheet is made of a thin sheet and a thick sheet of plastic laminated together, the thin sheet constituting the second layer and containing the reflective crystals and the thick sheet constituting the first layer and containing the particles.

References Cited by the Examiner

UNITED STATES PATENTS

| | | | |
|---|---|---|---|
| 2,934,997 | 5/1960 | Harkness | 88—28.9 |
| 2,944,462 | 7/1960 | Harkness | 88—28.9 |

JULIA E. COINER, *Primary Examiner.*